Oct. 10, 1961  A. N. PIACENTE  3,003,905
DECORATIVE PLASTIC SHEETS
Filed Jan. 13, 1958  2 Sheets-Sheet 1

INVENTOR.
ANTHONY N. PIACENTE
BY
ATTORNEY

Oct. 10, 1961  A. N. PIACENTE  3,003,905
DECORATIVE PLASTIC SHEETS
Filed Jan. 13, 1958  2 Sheets-Sheet 2
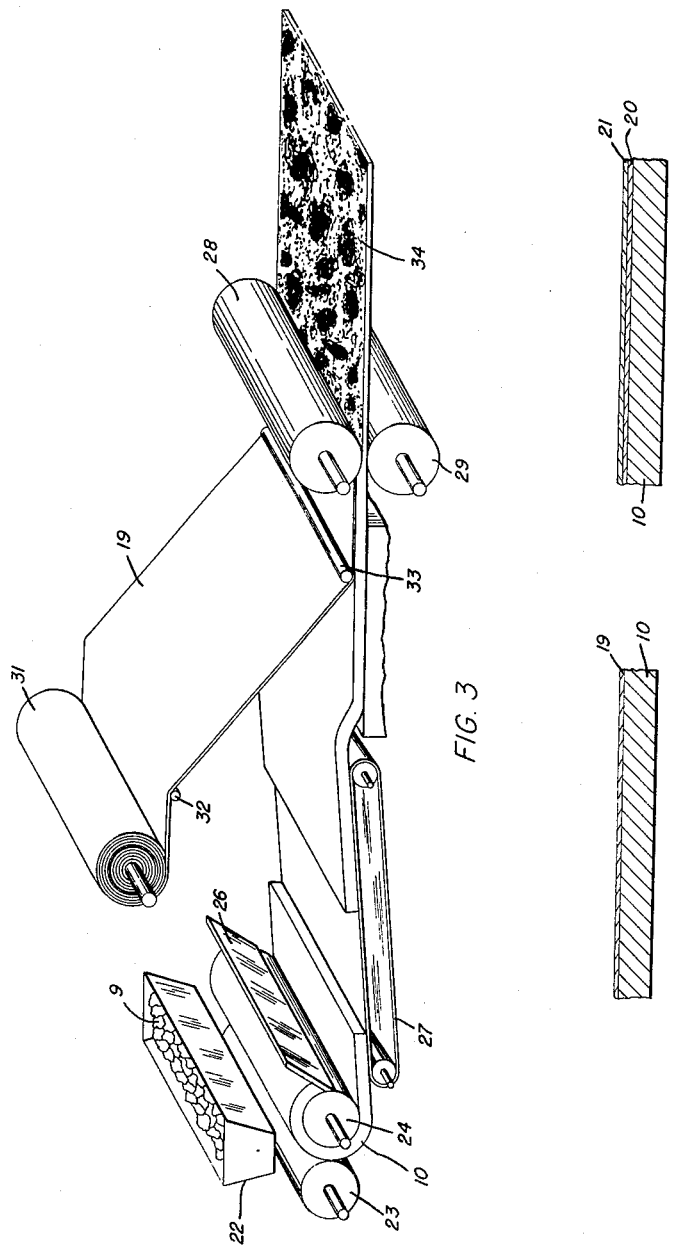
INVENTOR.
ANTHONY N. PIACENTE
BY
*Richard T. Laughlin*
ATTORNEY United States Patent Office 3,003,905
Patented Oct. 10, 1961

3,003,905
DECORATIVE PLASTIC SHEETS
Anthony N. Piacente, North Arlington, N.J., assignor to Congoleum-Nairn Inc., Kearny, N.J., a corporation of New York
Filed Jan. 13, 1958, Ser. No. 708,574
14 Claims. (Cl. 156—251)

This invention relates to a method for producing decorative sheet material and particularly to the production of such sheets having a unique design for use as flexible smooth surface covering for floors, walls, articles of furniture and the like.

Calendered sheets of composition material which are of varigated appearance, such as linoleum and vinyl compositions, have been produced by mixing together different colored pieces of the composition material and, while the mixed pieces are of plastic and moldable consistency, subjecting them to one or more calendering operations under conditions which are suitably controlled for producing the appearance desired. As an example, linoleum composition sheets are formed by mixing colored pieces of linoleum composition together and then calendering. During the passage of the pieces through the calender, they retain their individual colors but are subject to distinct distortional commingling. This distortional commingling is evidenced in the product of the first calendering by the fact that the pieces have become stretched out into long streaks to provide a striated effect that is commonly referred to as "jaspe." In addition to the jaspe effect, a simulated marble effect can be produced by further distortional commingling of the pieces of different color. This is usually accomplished by cutting previously formed jaspe sheets into lengths, turning the lengths 90°, lapping the turned lengths and calendering the lapped lengths. The lapped jaspe sheets are calendered with the jaspe streaks generally parallel to the calender rolls. This operation causes the jaspe streaks to be pulled transversely with the resultant production of a sheet having an appearance resembling marble.

One widespread method for producing a variegated color effect, which has been used particularly in connection with relatively heavy composition sheets, comprises initially forming a sheet having substantially uniform color throughout by passage between rolls and then adding decorative pieces of contrasting color which are essentially the same plastic composition as that of the sheet to which they are added. The sheet is then subjected to a calendering operation to embed the pieces into the initially formed sheet and distort their shape thereby forming streaks to provide a striated effect. This method is used quite extensively in producing decorative effects in what is commonly termed asphalt and vinyl asbestos tile. The uniform color sheet can be formed from the plastic mass after initial mixing. The decorative stock, however, must be separately made by mixing, sheeting and then breaking up the sheet into small pieces. These separate operations are time consuming and require the multiple handling of the small decorative pieces.

A great deal of work has been carried out to improve the efficiency of this latter process and thereby reduce cost. In addition, considerable efforts have been directed to producing other different and novel decorative effects in composition sheets. Most of the novel type designs have been developed, however, in the field of the molded type product. The molded type product is produced by applying pieces of composition material to a backing or mold in a prearranged or random manner and then pressing the pieces in a flat bed press to form a smooth, homogeneous sheet. This procedure, although capable of producing a large range of decorative and novel designs, is naturally a more expensive procedure since the pressing operation must be carried out in a step-wise manner.

A general object of the invention is to provide a process and apparatus for producing a flexible smooth surface covering having a novel decoration. Another object of the invention is to produce a decorative sheet having areas of non-directional design by the utilization of conventional high-speed calendering equipment. Another object is to provide a process which materially reduces the operations which were heretofore believed necessary to produce a variegated sheet. A further object of the invention is to provide a process and apparatus for producing a decorative sheet which is applicable to a large range of plastic composition materials.

In accordance with the invention, a decorative sheet of plastic composition material is produced by feeding between calendar rolls a thick sheet of composition material while maintaining on the surface of the sheet a thin sheet of compatible composition of contrasting coloration and, during the passage of the two sheets between the rolls, substantially reducing the gauge of the thick sheet. By this method, the thin sheet is broken up to expose portions of the base sheet and thereby produce a decoration which resembles flaky clouds, having areas of both directional and non-directional decoration. The thin sheet can be made up of a single sheet or two or more sheets laminated together which can be of contrasting coloration or have any desired surface decoration. A particularly striking decoration can be produced by using a thin sheet which has had portions removed such as square, round, star or the like cutouts. The use of a thin sheet to provide the decoration on the sheet has the advantage of eliminating many of the operations which were heretofore considered necessary to produce the conventional decorative pieces of stock. By using the procedure of the invention, it is no longer necessary to granulate a sheet to form decorative pieces and the necessary handling of such decorative pieces is eliminated.

Other objects, features and advantages of the invention will be apparent from the following detailed description of the invention when read in conjunction with the accompanying drawings in which:

FIG. 3 is a perspective view of one type of apparatus which can be used in accordance with the invention.

FIG. 4 is a cross section of the composition sheets prior to calendering used to produce the sheet illustrated in FIG. 1.

FIG. 5 is a cross section of the composition sheets prior to calendering used to produce the sheet illustrated in FIG. 2.

Figure 1:
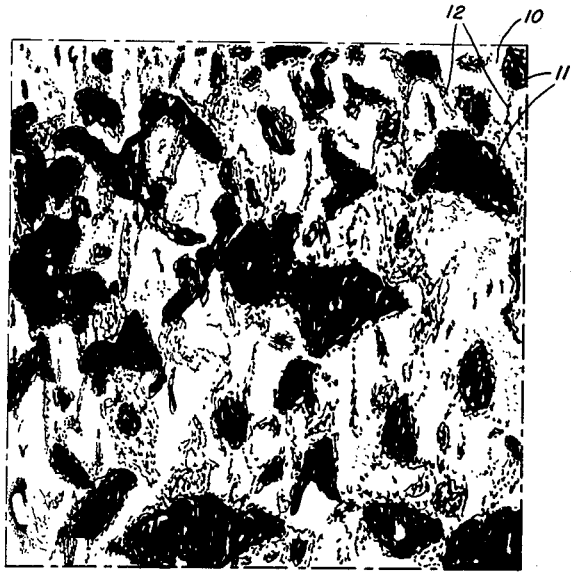
FIG. 1 is a plan view on a reduced scale of a smooth surface covering which illustrates the effect that can be produced in accordance with the process of the invention when using a single decorative sheet.
Figure 2:
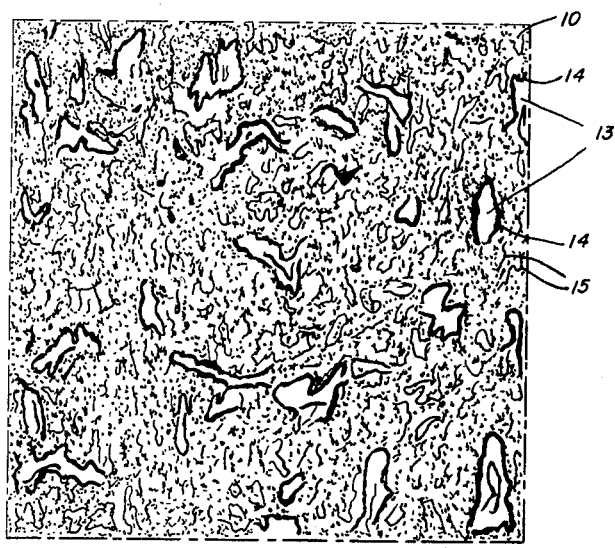
FIG. 2 is a plan view on a reduced scale of a smooth surface covering which illustrates the effect that can be produced in accordance with the process of the invention when using a two layer decorative sheet.

The surface covering shown in FIG. 1 illustrates how one thin decorative sheet applied to the surface of the composition has been distorted in a random manner so that the appearance closely resembles that of flaky clouds and has both directional and non-directional components in the decoration. The surface covering shown in FIG. 2 illustrates the result of applying a thin decorative sheet composed of two different colored sheets laminated together on a base sheet. The base sheet 10 in the illustrated floor covering shown in FIG. 1 makes up the major portion of the decoration on the surface of the sheet. The thin decorative sheet 19, shown in FIG. 4, has been broken up into a number of separate areas 11 of major decoration concentration which gives the product its non-directional characteristics. Other parts 12 of the thin decoration sheet 19 have been pulled out to form a striated effect thereby giving the decoration its directional characteristics. In the floor covering illustrated in FIG. 2, the base sheet 10 also makes up the major portion of the decoration. The thin two layer laminated sheet, shown in FIG. 5, has been broken up into a number of separate areas 13 of major decoration concentration which gives the product its non-directional characteristics. The separate areas 13 are surrounded by a thin line or area 14 of contrasting coloration which are formed by the bottom layer 20 of the two layer laminated sheet. Other parts 15 of the thin decorative sheet have been pulled out to form a striated effect thereby giving the decoration its directional characteristics. These latter streaks are formed primarily by the bottom layer 20 of the thin laminated sheet.

Composition material, hereinafter defined, is produced by mixing at a temperature sufficiently high to produce a plastic mass. The composition material 9 is then fed while plastic to a hopper 22 which dumps a measured charge of material between the nip of two horizontal rolls 23 and 24. The rolls are rotated in opposite directions and the face roll 24 is rotated at a slightly greater speed. A speed ratio of about 1:1.1 has been found satisfactory. The rolls are maintained at a temperature suitable to produce a sheet of composition material. The composition material 9 is permitted to revolve with the face rolls 24 until it has been formed on the roll into a smooth thick sheet 10 of uniform size. This operation usually requires 4 or 5 complete revolutions of the rolls. The sheet 10 thus formed is stripped from the roll 24 by any suitable means such as cutting by hand with a knife and pulling off or by the engagement of a doctor blade 26 or other suitable severing device. The sheet 10, as it passes from the roll 24, is picked up by a conveyor 27 which carries the sheet forward. The thickness of the sheet will depend a great deal on the components of the composition material and the thickness desired in the final sheet. When the final sheet is to be 0.125 inch thick, the sheet is preferably about 0.375 inch to about 1.75 inches thick.

The sheet 10 is carried by the conveyor belt 27 to a point where it is fed between two calender rolls 28 and 29. The thin sheet 19 which provides the decoration, comprising composition generally compatible with the base sheet is fed from a roll 31 and by means of guide rolls 32 and 33 is guided to a juxtaposition with the base sheet 10 prior to passing through calender rolls 28 and 29. The gauge of the sheet is reduced to at least one-third of its original thickness as it passes between these rolls 28 and 29. Normally, the gauge is not reduced below one-fifteenth of its original thickness.

The finished sheet 34 can be subjected to any desired further treatment, such as further gauge reduction, polishing and smoothing operations of laminating operations to laminate a backing, such as felt, to the sheet. The gauge of the sheet can be materially reduced in stages of relatively small increments. The sheet can then be cut into tiles, such as conventional 9 x 9 inch tiles or rolled up for use as sheet goods.

In the embodiment shown in FIG. 5, the thin sheet of decorative material is made up of two layers 20 and 21 and is fed to calender rolls 28, 29 in a manner similar to that described above for the single sheet. The thin decorative sheet must be materially thinner than the base sheet and of a harder consistency so that its non-directional effect is not lost by too much distortional commingling. The thin decorative sheet should be less than about one-third the thickness of the base sheet. The gauge reduction upon calendering must be sufficient to break up the decorative sheet thereby exposing the base sheet. Usually a gauge reduction to at least one-third the original thickness is necessary to give the desired results.

The process of this invention is applicable to any composition material which is thermoplastic enough to be reduced in gauge and calendered to produce smooth sheets of material. Typical of the composition used to produce such sheets are linoleum compositions, rubber compositions, synthetic resinous compositions and natural resinous compositions. Such composition material is usually comprised of binders, fillers, pigments, stabilizers and minor portions of other ingredients. The binder is usually present in from 20 to 80% of the composition and can contain suitable softening agents, such as plasticizers, other resins and the like.

Typical linoleum compositions are composed of drying or semidrying oils, resins, fillers and pigments. The siccative oil can be linseed, tall, perilla, rubberseed or any oil which upon oxidation yields a substantial amount of the oxidized glycerides of linolic and/or linolenic acids in fluid phase. The resin can be rosin, ester gum, fused Congo, Congo ester, kauri gum or the like. The filler can be ground cork, wood flour, whiting, china clay asbestine or the like. A typical linoleum formulation contains from about 25 to 50 percent linoleum cement, about 25 to 35 percent vegetable filler and about 25 to 40 percent mineral filler. The linoleum composition is prepared by mixing the siccative oil and resin and oxidizing the mixture while heating. When the linoleum cement has been properly oxidized and aged, it is mixed with the filler and pigment and calendered into a sheet. The initial sheet forming of linoleum is usually carried between rolls at a temperature of about 160° F. to 220° F. and a pressure of about 900 to 1,200 pounds per square inch. The roll contacting the surface of the sheet is usually maintained at a substantially lower temperature than the roll contacting the back of the sheet. The gauge reduction in the second calendering is carried out with the sheet at approximately the same temperature as the first calendering. Typical roll temperatures are a back roll of 190° F. and a face roll of 60° F. The plastic composition sheet is fed into the calender at a temperature of about 150° F. The finished sheet is usually cured by maintaining at a temperature of about 180° F. for a period of several weeks. Linoleum compositions can be classified as a thermoplastic material since, during the period of sheet formation, they have all the characteristics of a thermoplastic sheet. It is not until subsequent aging of the composition that it assumes its thermosetting properties.

A particularly useful surface covering can be made by utilizing a composition containing a thermoplastic synthetic resin. Such compositions contain resins, plasticizers, fillers, pigments and stabilizers. The polyvinyl resins are the most widely used in floor and wall coverings and particularly polyvinyl chloride polymers and copolymers of polyvinyl chloride and polyvinyl acetate containing from about 80 to 98 percent vinyl chloride. The resins of this type which are of particular usefulness are thermoplastic resins having a softening point above about 150° F. and specific viscosity above about 0.17 as measured in a solution containing 0.20 gram of resin per 100 milliliters of nitrobenzene at 20° C. Copolymers of vinyl chloride with dibutyl maleate, ethyl acrylate, methyl acrylate, butyl acrylate, methyl ethyl acrylate and butylmethylacrylate, all containing substantially the same amount of combined vinyl chloride and having the same viscosity, also have been used. In addition, copolymers of vinyl chloride and acrylonitrile containing about 45 to 80% vinyl chloride can be used, as well as copolymers of vinyl chloride and vinylidene chloride. Typical of other suitable resins are polyacrylonitrile, polymethylacrylates, and hydrocarbon resins such as polybutylene and polyethylene.

Suitable plasticizers for the thermoplastic resin include tricresyl phosphate, dioctyl phthalate, dicapryl phthalate, dibutyl sebacate, dibutoxy ethyl phthalate, dipropylene glycol dibenzoate, dibutoxyglycol phthalate, polyethylene glycol di-2-ethylhexoate, triethylene glycol di-2-ethyl hexoate. The filler can be fibrous or non-fibrous or a combination of both. Suitable fibrous fillers are asbestos, cork wood flour, cellulose fibers, fibrous talc, animal fiber and the like. Non-fibrous fillers include asbestine, barytes, calcium carbonate, calcium sulfate, clay, domonite, mica, silica, slate flour, serpentine, talc. The initial mixing of the components is carried out at about 300° F. to about 375° F. and the calendering at a temperature between 130° F. and 350° F.

Rubber compositions can contain either natural or synthetic rubber as the binder. The proportions for such compositions are similar to those for the synthetic resinous composition described above and the processing is carried out in a similar manner, except that rubber compositions usually require a curing period to harden the composition. Such curing is usually carried out at a temperature of about 200° to 275° F. for a period from a few minutes to several hours.

A composition used for forming what is conventionally called "asphalt tile" can also be used. Such compositions usually contain binders of light colored natural resins. The most commonly used ones are coal tar and petroleum derived resins having a melting point of about 100° to 175° C. A typical formulation contains about 15 to 35 percent resin, about 5 to 15 percent softening agents and the remainder fillers and pigments. Such a composition is usually mixed at a temperature between 250° and 300° F. and initially calendered between rolls maintained at a temperature less than about 230° F.

The decorative sheet is preferably formed of the same composition as the base sheet but of brittler consistency. The brittle consistency can be obtained in various manners. In the case of linoleum, reduced binder can be used or the composition can be slightly aged such as for an additional day. In the case of synthetic and natural resins, a resin with a higher softening point than the resin in the base sheet can be used or less plasticizer for the resin or reduced binder content. As an illustration, a synthetic resinous binder content of about 10 to 15 percent is desirable for the decorative sheet. In a similar manner, when using a rubber composition, less binder or plasticizer can be used. The relative hardness of the sheet can also be controlled by the temperature to which each sheet is heated upon calendering. The thick sheet is heated to a temperature at which it is workable prior to calendering and therefore when the thin sheet is placed on top of the hot sheet, it will absorb part of the heat. By controlling the time the thin sheet is in contact with the thick sheet prior to calendering, it is possible to control the hardness of the thin sheet. The degree of hardness or brittle consistency determines the type of decoration produced. If the sheet is relatively hard, there will be substantially more non-directional design element and if softer or brittler, there will be more directional design elements. The economy of operation gained will depend in large part upon the amount of decorative material in the final product. The more decorative material, the greater the economy of operation in eliminating the granulating and handling operations which would normally be necessary. In the final product, the decorative sheet generally represents about 2 to 30 percent of the total composition and preferably about 5 to 10 percent.

As mentioned heretofore, the decorative sheet can be a single layer or can be formed of two or more layers. If two or more layers are used, it is preferable to laminate the layers together prior to feeding to the calendering operation although they can be fed separately. The lamination can readily be carried out by placing the sheets together and then heating the sheets and passing them through a calender which exerts just sufficient pressure to bind the sheets together. The decorative sheet can be a solid color or can have a decorative or variegated appearance. As is apparent, however, a certain amount of the economy of operation is lost by using a variegated sheet. A particularly attractive decoration is obtained by using a three layer laminated sheet where the middle sheet is a color which contrasts with the color of the outer sheet. Rather unusually decorative effects are obtained by using a decorative sheet which has had areas of the sheet cut out or pushed out. This is particularly the case when a laminated sheet is used and different cutouts have been made in each of the sheets making up the laminate. Generally, the base sheet is about 0.50 to 2.00 inches thick and the decorative sheet is less than 1/10 the thickness of the base sheet and preferably from about .015 to about 0.125 inch. A particularly desirable range is a base sheet of about 1.0 to 1.5 inches and a decorative sheet of about 0.05 to 0.08 inch. The decorative sheet produced is usually about from 0.025 to about 0.190 inch thick.

*Example 1*

The following composition is charged into a Banbury mixer and blended at approximately 300° F. for a perod of three minutes:

| | Parts |
|---|---|
| Polyvinyl chloride | 19.0 |
| Tricresyl phosphate | 4.8 |
| Butylbenzyl phthalate | 4.4 |
| Asbestos | 19.0 |
| Calcium carbonate | 48.0 |
| Titanium oxide | 3.8 |
| Stabilizer | 1.0 |

The binder composition is calendered at 300° F. between two rolls maintained at 110° and 210° F., respectively. The composition sticks to the warmer roll which is rotated at a slightly faster speed. The composition is allowed to form a smooth base sheet of approximately 1.50 inches thick on the warm roll. The sheet is then removed from the roll and passed to the nip of a second two roll calender. A second decorative sheet having a thickness of 1/16 inch was made in a similar manner as the base sheet except that the binder consisting of resin and plasticizer makes up only 13 percent of the composition and a red pigment is added. At this point, the base sheet has a temperature of about 275° F. The top calender roll is maintained at a temperature of 180° F. and the bottom roll at 90° F. The decorative sheet is fed at room temperature (72° F.) to the calender on top of the base sheet. The decorative sheet thus formed has a thickness of about 1/8 of an inch, representing a gauge reduction of over two-thirds and is passed through two succeeding calendering operations to reduce its gauge to 0.062 inch. The sheet is then cooled and cut into tiles. The decoration formed on the sheet resembles a flaky cloud and extends for a substantial depth into the sheet.

*Example 2*

A conventional linoleum composition is formed containing 37.9 percent binder which consists of blown and polymerized linseed oil and a small portion of rosin, 27.5 percent wood flour, 25.7 percent calcium carbonate and 9.6 percent pigments, and calendered to form a sheet about 0.50 inch in thickness. Decorative pieces formed from a similar composition but aged for one day are sheeted in a similar manner to form the decorative sheet. The calender rolls are adjusted to produce a sheet 0.052 inch in thickness. The sheet is then laminated to asphalt saturated felt and subjected to the conventional curing at 160° F. for a period of six weeks. The finished sheet has a smooth surface with a decoration characterized by a series of streaks in combination with large areas of color.

The precise temperature and temperature differential of the calender rolls will depend in large measure on the particular composition being processed. The temperature of the sheet should be such that it is thermoplastic enough to be readily calendered. The top roll should preferably just supply enough heat to the decorative pieces to become plastic and deformable.

Any departure from the above description which con-

What is claimed is:

1. A process for producing a smooth sheet of composition material having a variegated decoration which comprises feeding to the nip of two calender rolls a thin sheet of composition material on the surface of a substantially thicker composition sheet in a plastic state and substantially reducing the gauge of said thick sheet by passing between said calender rolls thereby pressing said thin sheet into said thick sheet while simultaneously breaking up portions of said thin sheet to expose portions of the thick sheet in the surface of the unitary calendered sheet produced.

2. A process for producing a smooth sheet of composition material having a variegated decoration which comprises feeding to the nip of two calender rolls a composite sheet of at least three layers comprising a composition sheet of substantial thickness in a plastic state and at least two thinner sheets of composition material on the surface of said composite sheet and reducing the gauge of said thick sheet to less than one-third its original thickness by passing between said calender rolls, thereby breaking up portions of said thin sheet and exposing portions of said thick sheet in the surface of the unitary calendered sheet produced.

3. A process for producing a smooth sheet of composition material having a variegated decoration which comprises feeding to the nip of two calender rolls a thin composition sheet on the surface of a composition sheet of contrasting color and of substantial thickness in a thermoplastic state, and reducing the gauge of said thick sheet to less than one-third its original thickness by passing between said calender rolls thereby pressing said thin sheet into said thick sheet while simultaneously breaking up portions of said thin sheet to expose portions of the thick sheet in the surface of the unitary calendered sheet produced.

4. A process for producing a smooth sheet of composition material having a variegated decoration which comprises feeding in a thermoplastic state a composition sheet of substantial thickness between two calender rolls to substantially reduce its gauge to between one-third and one-fifteenth of its original thickness, said calendering being carried out while maintaining on the surface of said thick sheet a thin sheet of compatible composition material having a thickness less than $\frac{1}{10}$ the thickness of said thick sheet, thereby pressing said thin sheet into said thick sheet while simultaneously breaking up portions of said thin sheet to expose portions of the thick sheet in the surface of the unitary calendered sheet produced.

5. A process for producing a smooth sheet of composition material having a variegated decoration which comprises feeding to the nip of two calender rolls a sheet of composition material on the surface of a compatible composition sheet in a thermoplastic state and of at least ten times greater thickness, and passing said two sheets simultaneously between said calender rolls thereby reducing the gauge of said thicker sheet to between one-third and one-fifteenth of its original gauge and pressing said thinner sheet into said thicker sheet while breaking up portions of said thinner sheet to expose portions of the thick sheet in the surface of the unitary calendered sheet produced.

6. A process for producing a smooth sheet of composition material having a variegated decoration and a thickness between about 0.025 and 0.190 inch which comprises feeding to the nip of two calender rolls a thin sheet of thermoplastic composition having a thickness of from about 0.015 to about 0.125 inch on the surface of a composition sheet in a thermoplastic state having a thickness between 0.50 and 2.00 inches, passing said two superimposed sheets between said calender rolls to reduce the gauge of said thicker sheet to between one-third and one-fifteenth of its original gauge thereby pressing said thin sheet into said thick sheet while simultaneously breaking up portions of said thin sheet to expose portions of the thick sheet in the surface of the unitary calendered sheet produced and subjecting the sheet thus produced to additional calendering operations to reduce its gauge.

7. A process for producing a smooth sheet of vinyl composition material having a variegated decoration which comprises feeding to the nip of two calender rolls a thick sheet of vinyl composition in a thermoplastic state having superimposed on its surface a second sheet of less than $\frac{1}{10}$ its thickness of vinyl composition of contrasting color, and passing said superimposed sheets between said calender rolls thereby substantially reducing the gauge of said thick sheet to at least one-third its original gauge and simultaneously pressing said thin sheet into said thick sheet thereby breaking up said thin sheet to expose portions of the thick sheet in the surface of the unitary calendered sheet produced.

8. A process for producing a smooth sheet of vinyl composition material having a variegated decoration which comprises feeding to the nip of two calender rolls a thermoplastic composition sheet of substantial thickness comprising a vinyl resinous binder and asbestos fibers having superimposed on its surface a second thin sheet of vinyl composition of contrasting color of less than $\frac{1}{10}$ the thickness of said thick sheet and passing said superimposed sheets between said calender rolls thereby substantially reducing the gauge of said thick sheet to at least one-third its original gauge and simultaneously pressing said thin sheet into said thick sheet thereby breaking up said thin sheet to expose portions of the thick sheet in the surface of the unitary calendered sheet produced.

9. The process of claim 8, wherein the composition sheet of substantial thickness is fed to the calender rolls at a temperature within the range of about 200° F. to 300° F. and said two calender rolls are maintained at substantially lower temperatures with the warmer of said two rolls contacting the surface of said thick sheet.

10. The process of claim 8 wherein said sheet of substantial thickness is approximately 0.50 to 2.0 inch thick.

11. A process for producing a smooth sheet of vinyl composition having a variegated decoration which comprises feeding to the nip of two calender rolls a thick sheet of vinyl composition in a thermoplastic state containing about 20 to about 80% binder having superimposed on its surface a second thin sheet of vinyl composition having a brittle consistency and containing about 10 to about 15% binder having a thickness less than $\frac{1}{10}$ the thickness of said thick sheet and passing said superimposed sheets between said calender rolls thereby substantially reducing the gauge of said thick sheet to at least one-third its original gauge and simultaneously pressing said thin sheet into said thick sheet thereby breaking up said thin sheet to expose portions of the thick sheet in the surface of the unitary calendered sheet produced.

12. A process for producing a smooth linoleum sheet having a variegated decoration which comprises feeding in a thermoplastic state a linoleum composition sheet of substantial thickness to the nip of two calender rolls, superimposing a second sheet of harder linoleum composition of contrasting color on the surface of said thick sheet and passing said superimposed sheets between said calender rolls thereby reducing the gauge of said thick sheet to less than one-third its original gauge while simultaneously pressing said thin sheet into said thick sheet thereby breaking up portions of said thin sheet to expose portions of the thick sheet in the surface of the unitary calendered sheet produced.

13. The process of claim 12 wherein the linoleum sheet of substantial thickness is fed to the calender rolls at a temperature within the range of 150 to 250° F. and said calender rolls are maintained at substantially lower temperatures with the cooler of said two rolls contacting the surface of said thick sheet.

14. The process of claim 13 wherein said sheet of substantial thickness is approximately 0.50 to about 2.00 inches thick.

References Cited in the file of this patent

UNITED STATES PATENTS

| | | |
|---|---|---|
| 1,001,836 | Fritz | Aug. 29, 1911 |
| 2,042,964 | Rinehart | June 2, 1936 |
| 2,113,158 | Mayer | Apr. 5, 1938 |
| 2,548,029 | Kurtz | Apr. 10, 1951 |
| 2,722,265 | Kelley | Nov. 1, 1955 |
| 2,775,994 | Rowe | Jan. 1, 1957 |
| 2,837,457 | Baxter | June 3, 1958 |